US010493825B2

United States Patent
Woodrow

(10) Patent No.: US 10,493,825 B2
(45) Date of Patent: Dec. 3, 2019

(54) WINDSHEILD FOR LOW SPEED VEHICLES SUCH AS GOLF CARS

(71) Applicant: Fitz Woodrow, Lexington, SC (US)

(72) Inventor: Fitz Woodrow, Lexington, SC (US)

(*) Notice: Subject to any disclaimer, the term of this patent is extended or adjusted under 35 U.S.C. 154(b) by 0 days.

(21) Appl. No.: 16/148,348

(22) Filed: Oct. 1, 2018

(65) Prior Publication Data

US 2019/0030999 A1 Jan. 31, 2019

Related U.S. Application Data

(63) Continuation-in-part of application No. 15/630,423, filed on Jun. 22, 2017, now abandoned, which is a continuation of application No. 14/454,424, filed on Aug. 7, 2014, now Pat. No. 9,713,948.

(60) Provisional application No. 61/863,803, filed on Aug. 8, 2013.

(51) Int. Cl.
| | | |
|---|---|---|
| *G02F 1/03* | (2006.01) | |
| *G02F 1/07* | (2006.01) | |
| *B60J 1/06* | (2006.01) | |
| *B60J 3/04* | (2006.01) | |
| *G02F 1/01* | (2006.01) | |
| *G02F 1/153* | (2006.01) | |

(52) U.S. Cl.
CPC . B60J 1/06 (2013.01); B60J 3/04 (2013.01); G02F 1/0126 (2013.01); G02F 1/153 (2013.01); *G02F 2202/14* (2013.01)

(58) Field of Classification Search
CPC ... B60J 1/06; B60J 3/04; G02F 1/0126; G02F 1/153; G02F 2202/14

USPC ........ 359/241; 264/1.7, 1.32; 425/412, 413, 425/447, 475.8; 428/447, 412, 519, 522, 428/524; 427/164; 351/166; 350/409

See application file for complete search history.

(56) References Cited

U.S. PATENT DOCUMENTS

| | | | |
|---|---|---|---|
| 4,081,934 A | 4/1978 | Franz | |
| 6,138,738 A | 10/2000 | Moller | |
| 6,414,796 B1 * | 7/2002 | Muromachi | ...... B32B 17/10036 340/980 |
| 7,143,979 B2 | 12/2006 | Wood et al. | |
| 7,673,923 B2 | 3/2010 | Reese | |
| 8,199,264 B2 | 6/2012 | Veerasamy | |
| 8,384,531 B2 * | 2/2013 | Szczerba | ............... G01S 13/723 340/435 |
| 8,405,911 B2 * | 3/2013 | Uematsu | ........... G02B 27/0101 359/630 |
| 8,482,834 B2 | 7/2013 | Cordova | |
| 8,977,489 B2 * | 3/2015 | Szczerba | ............. G01C 21/365 345/7 |
| 9,080,379 B2 | 7/2015 | Guillemette | |

(Continued)

OTHER PUBLICATIONS

International Search Report from corresponding International Application No. PCT/US2014/050203, dated Dec. 16, 2014.

*Primary Examiner* — William R Alexander
*Assistant Examiner* — Tamara Y. Washington
(74) *Attorney, Agent, or Firm* — Merchant & Gould P.C.

(57) ABSTRACT

Provided is a low speed vehicle, such as a golf car, comprising a unique windshield. The windshield comprises a hinge and a top mount allowing the windshield to fold up for improved upper body safety and improved air circulation. The windshield has an upper portion that is fixed. The golf car/low speed vehicle also comprises a system for creating a virtual, visual display of information on the upper fixed portion of the windshield.

23 Claims, 13 Drawing Sheets

(56) References Cited

U.S. PATENT DOCUMENTS

| | | |
|---|---|---|
| 2005/0086843 A1 | 4/2005 | Buchanan |
| 2007/0291473 A1 | 12/2007 | Traynor |
| 2009/0116098 A1 | 5/2009 | Chang |
| 2011/0001331 A1 | 1/2011 | Hirneise |
| 2011/0255051 A1 | 10/2011 | McCabe |
| 2012/0098290 A1 | 4/2012 | Miller |
| 2013/0293452 A1* | 11/2013 | Ricci ................ G02B 27/01 345/156 |
| 2018/0277028 A1* | 9/2018 | Mader ................ B60R 1/04 |

* cited by examiner

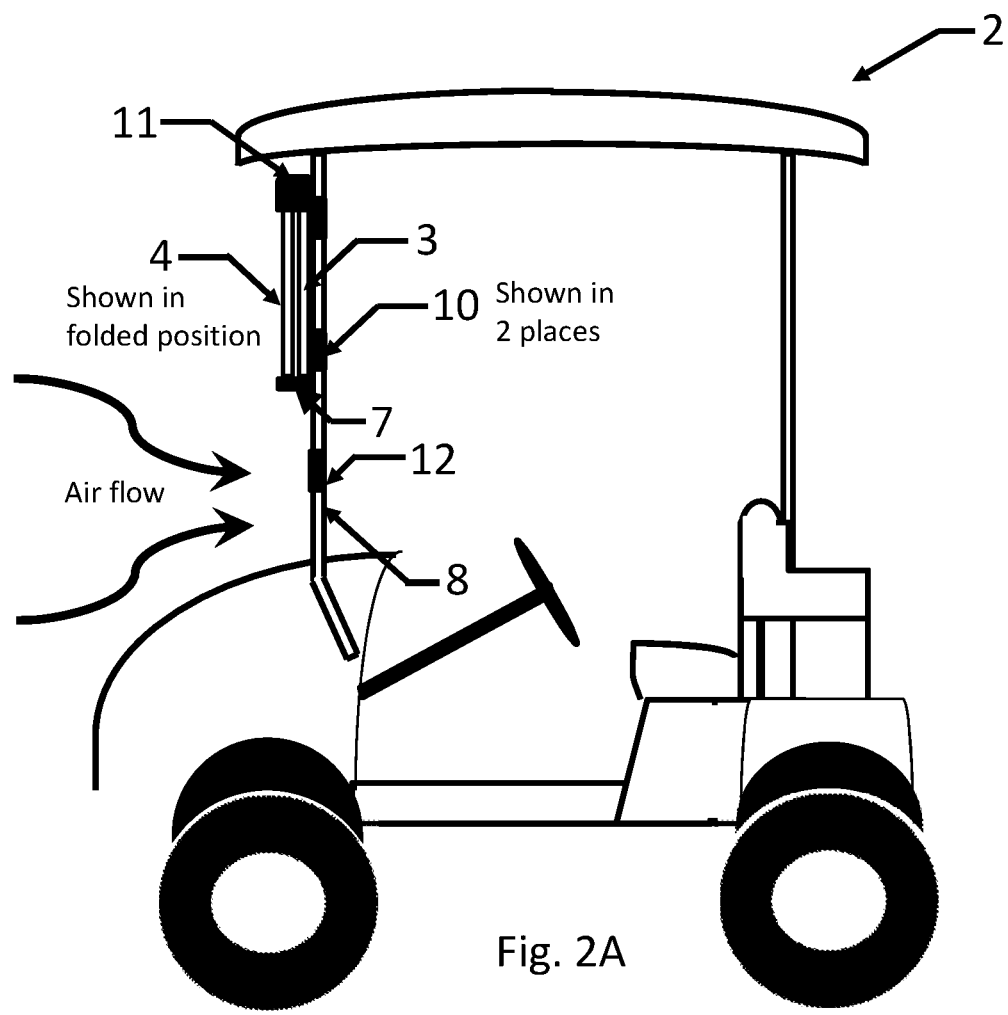

Measurements are for reference only and are non-limiting

Support structure not shown for clarity

Shown in folded position

Attachment device comprises 1 or more bolts shown in 4 places

WINDSHEILD FOR LOW SPEED VEHICLES SUCH AS GOLF CARS

The present application is a continuation-in-part application of, and claims priority to, U.S. patent application Ser. No. 15/630,423 filed Jun. 22, 2017, which in turn is a continuation of U.S. patent application Ser. No. 14/454,424 filed Aug. 7, 2014, which also claims priority to U.S. Provisional Application Ser. No. 61/863,803 filed Aug. 8, 2013, the contents of all the above applications are incorporated herein by reference in their entirety.

FIELD OF THE INVENTION

The present invention relates to a windshield for low speed vehicles, such as a golf car and improvements in a golfer's experience by relaying information to the golfer displayed on the windshield.

BACKGROUND

There are several types of low speed vehicles, which are typically intended for other than highway use. Golf cars, a popular low speed vehicle, are defined under ANSI/NGCMA Z 130.1 as a vehicle used to convey a person or persons and equipment to play the game of golf in an area designated as a golf course. To qualify as a golf car the vehicle's average speed shall be less than (24 kin/h) 15 MPH on a horizontally level surface, 0.5% grade (0.3 degrees) comprised of a straight course composed of a concrete or asphalt surface that is dry and free from loose material or surface contamination with a minimum coefficient of friction of 0.8 between tire and surface.

If a vehicle is capable of 15 MPH or more under the foregoing circumstances, it does not constitute a "golf car." It will be considered either a Personal Transport Vehicle, ("PTV"), or a Low Speed Vehicle, ("LSVs"), other than a golf car.

The first golf car was invented in 1932. Since then many patented improvements have been made to these low speed vehicles. The first windshield was clear and fixed, adding a safety component by blocking the driver and passenger from wind, rain, and debris. More recent versions of a windshield is a transparent fold down windshield where the windshield is fixed to the lower front struts and is hinged to allow the upper portion of the window to fold down over the fixed lower portion. The majority of operators put the windshield down to allow wind though the car to keep the occupants cooler through airflow. These windshields generally use gravity to hold the windshield in the folded down position, exposing the occupants' upper body and head to stray golf balls and debris. Further, the folded down windshield offers no safety from harmful UVA and UVB rays and weather elements.

Accordingly, an objective of this invention is to provide a windshield that will provide a safe and appropriate environment in which to operate or ride in a golf car (golf cart), PTV, or LSV, including utility vehicles that meet the ANSI definition for any of the above.

A second objective of this invention is to provide the user an improved experience by utilizing a fixed upper portion of the windshield as a display.

SUMMARY

The present invention accomplishes the foregoing objectives by mounting the windshield to a vertical front strut or other support structure on the front of the vehicle with the ability to have the lower portion of the windshield fold-up. The fixed upper portion of the folding windshield is installed by a method to keep the upper portion attached to the car during normal use, although the entire windshield may be removed if required, for example maintenance or storage of the windshield or vehicle. A rotatable device, preferably a hinge or living hinge, at a mid-point allows the lower portion to fold up. Clamps or clips secure the lower portion to the fixed upper portion when in the folded position including while the vehicle is moving. This provides protection to heads and upper torso of the vehicle operator and the front seat passenger from external elements such as sun, wind, and possible debris at all times.

The present inventive windshield may comprise a color change property on a portion or all of the windshield. The color change property may comprise a photochromic substance part of a single or dual coating system, which combines quick color changing properties, flexibility, and abrasion resistance. The inventive windshield may comprise substantially mar resistant total UV blocking, filtered visible light, and rapid color change properties This ability is available as an option to darken the windshield appropriately for the weather and time of day. The windshield also protects the face and head area.

Operators and riders in any and all industries that use these types of vehicles will have the opportunity to have the safety and comfort, not only from the potential harmful sun's rays, but also from other undesirable elements.

The fixed upper windshield portion can also be used with a system to create a virtual display of information on the fixed upper windshield portion. The information displayed can enhance the golfer's experience, for example, by providing course information, wind conditions, hole information and distance to the hole.

Among other factors, it has been discovered that a mounted windshield, with a fixed upper portion and a lower portion that has the ability to fold-up along a mid-point may be provided with color changing properties that provide protection from UV and visible light, keep the interior space of the car cooler, and provide improved airflow and more safety to passengers. The fold-up element of the windshield will allow the occupants to get airflow through the open lower portion of the windshield, cooling the vehicle, while the fixed upper portion will protect the occupant from debris and wind. The color change property of the windshield will protect the occupants' eyes and face from harmful UVA and UVB sunrays. A windshield that adapts to the ambient light by changing color allows for safer operation of the vehicle, day or night. The present windshield may also be adapted to other PTVs, LSVs and other utility vehicles. While offering the foregoing benefits, a system can also be employed to create a virtual display of information on the fixed upper windshield portion. This is only possible due to the upper portion of the windshield being fixed. The system and its information will certainly enhance the golfer's experience.

BRIEF DESCRIPTION OF THE FIGURES OF THE DRAWING

FIGS. 2A and 2B are side views of the low speed vehicle in FIG. 1A showing the window in the folded and non-folded position.

In FIG. 4A, the lower portion is folded over the upper portion and in FIG. 4B, the lower portion is in the non-folded position.

DETAILED DESCRIPTION

Definitions

Figure 1A:
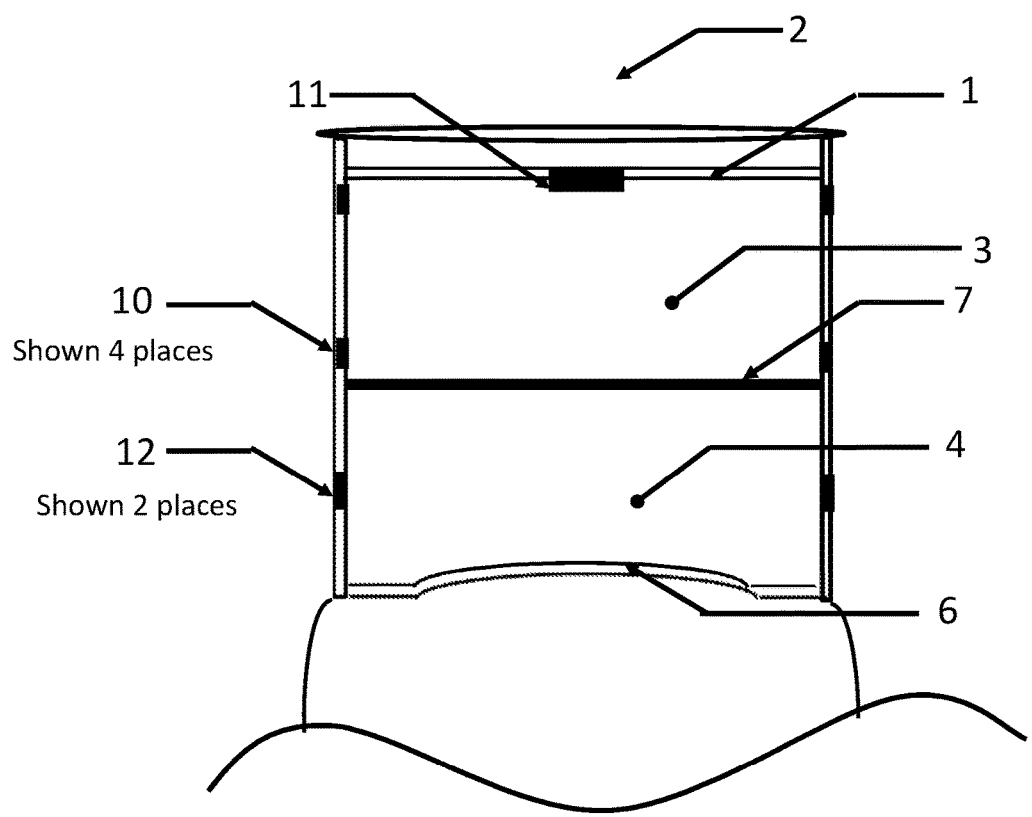
FIGS. 1A and 1B are a front view of the low speed vehicle showing alternate embodiments of the windshield

Color changing property: wherein a device such as a windshield or film will change from clear transparent to a tinted configuration upon a changing condition and will revert from the tinted configuration to clear transparent upon a second changing condition.

An example of a color changing property is a film comprising a photochromic compound wherein the film will change from clear transparent to a tinted configuration upon exposure to a sufficient intensity of light (first triggering event) and will revert back to clear transparent when no longer exposed to a sufficient intensity of light (second triggering event).

Fixed portion: a portion that is not intended to be moved or have the position change, e.g. fold, slide, or otherwise change position, during normal use of the vehicle by an occupant.

Fixedly attached: attached in a manner wherein the attached device is not intended to be moved or have the position changed, e.g. fold, slide or otherwise change position, during normal use of the vehicle by an occupant but may be movable or removable while the vehicle is not in use, e.g. in the garage, for storage or for maintenance.

A portion of a device that is fixed or fixedly attached is a description for the normal intended use of that portion of the device by an occupant, but does not bar the removal and re-attachment of said portion from the vehicle, e.g. for use of the vehicle without a windshield at various intervals. The folded or movable portion is intended to be changed at any time during use, for example while on the golf course. Removal of an entire windshield, which would entail removal of the fixed portion, would typically be performed prior to driving the vehicle to the golf course and therefore is not an intended use by the occupant.

The windshield, with its color change qualities, can employ various different embodiments.

In one embodiment the windshield is top mounted with a hinge or living hinge that allows a lower portion to fold up, allowing improved airflow into the vehicle. The hinged lower portion may comprise any percentage of the window, for example, the lower portion may comprise the lower 20% of the windshield, the lower 30%, the lower 50% or greater. The hinged lower portion may be one piece or multiple pieces hinged to the upper portion. The windshield may comprise UV protection over the entire windshield or over portions of the windshield. The windshield may comprise color-changing properties to reduce visible light over the entire windshield or over portions of the windshield; the degree of color change may be consistent over the entire windshield or may have different degrees of color change properties. A portion of the windshield may darken substantially more than other portions of the windshield. All or portions of the windshield may not have color change properties.

In one embodiment the portion above the hinge may have color change properties that are substantially greater than the lower portion or portions.

In one embodiment the peripheral area of the windshield may have color change properties that are substantially greater than central areas of the windshield.

In one embodiment the upper portion may have a graded color change property.

In one embodiment the entire windshield may have a graded color change property.

In one embodiment the color change properties are photochromic and respond to the degree of light.

In one embodiment the color change properties are electrochromic and respond to an electrical signal.

In one embodiment the color change properties are thermochromic and respond to temperature.

In one embodiment the UV protection and color change properties are included in a single layer film, a multilayer film, or multiple layers of film on an external surface, on an internal surface, buried within the windshield or a combination of internal, external and buried films.

In one embodiment the UV protection and color change properties are included as an additive to the windshield material.

In one embodiment the UV protection and color change properties are included as an additive to the windshield material and included in an internal, external, or buried film or combination of films.

The advantages of such a color changing top mounted windshield include being able to drive safely at night with a clear windshield, as opposed to driving with a tinted windshield or no windshield at all. The fold-up design is more aerodynamic than the fold down design, as the fold-up design reduces drag on the vehicle in addition to protecting the face of the occupants from wind and flying debris/objects resulting in a more comfortable ride. The airflow under the folded window allows cooling wind within the vehicle without the wind buffeting the occupants face. Color change properties are not effective in the window design of the prior art as there is not a window in front of the occupant when folded down, which is the most common use on sunny days. The color change properties of the windshield provides substantially total blocking of UVA and UVB radiation at all times. For example, one embodiment provides activated transmittance of light in the 300 to 400 nm range at 2% or less, and filters light in the visible range, as needed, whether sunny, cloudy or in between. The windshield would be able to darken quickly in sunlight, typically achieving a gray or brown tint in bright, glaring light, while providing convenient and automatic UVA/UVB and glare protection at all times. The windshield would be as clear as non-tinted golf car windshields when the windshield is not exposed to light, while also enjoying the protection offered by the color changing properties of the windshield, when needed.

Turning now to the Figures of the Drawing, the numbers in each figure, when the numbers are the same, refer to the same elements, which elements and corresponding numbers are listed below:

LIST OF ELEMENTS (1) windshield
(2) golf car/vehicle
(3) upper portion of the windshield
(4) lower portion of the windshield
(5) L-shape portion of the windshield (optional)
(6) curved profile along the lower portion of the windshield
(7) rotatable connection
(8) Vertical struts or vertical frame members
(9) Horizontal top strut or horizontal top frame member
(10) first attachment device (for fixedly holding upper portion of windshield)
(11) second attachment device (for holding lower portion in folded position)
(12) third attachment device (for holding lower portion in closed (down) position)
(13) u-shaped stripping
(14) clamp mechanism of second attachment (one embodiment) for securing windshield when folded
(15) flanges on second attachment (one embodiment) for fixedly attaching to windshield
(16) living hinge (one embodiment)
(17) living hinge membrane
(18) living hinge ball joint attachment
(19) living hinge insertion cavity
(20) living hinge attachment mechanism
(21) living hinge bottom portion of attachment mechanism
(22) frame for upper portion of windshield
(23) notch in upper windshield for clamp (optional)
(24) notch in upper windshield for bolt attachment (optional)
(25) tapered profile for stress relief FIG. 1 illustrates an embodiment the inventive windshield (1) as installed in a golf car (2) that includes a fixed upper portion (3) and a movable lower portion (4) pivotally connected by a pivoting means (7), e.g. hinge(s), living hinge(s) or other rotatable device(s). The edges of the windshield are typically routed by an NC router, wherein the edge may be flat or rounded depending on the selection of the router bit. A radius may be provided for all routed corners, to accommodate the necessary fit and to prevent damage at corners such as cracking.

The fixed upper portion (3) is fixedly attached by a first attachment device(s) (10). In FIG. 1A, the first attachment device is shown in 4 places and in FIG. 2A, the first attachment device is shown in 2 places. The first attachment device(s) (10) of this embodiment may comprise 1, 2, 3, 4 or more attachment devices. The first attachment device of this embodiment may comprise a bolt and nut configuration as shown in FIG. 4 or may comprise a clamp or clip track extrusion device, as is typical in the prior art, or any other known attachment device such as rivets. When the first attachment device is a clamp or clip track extrusion, the clamp or clip is one long extrusion or multiple shorter extrusions.

Figure 1B:
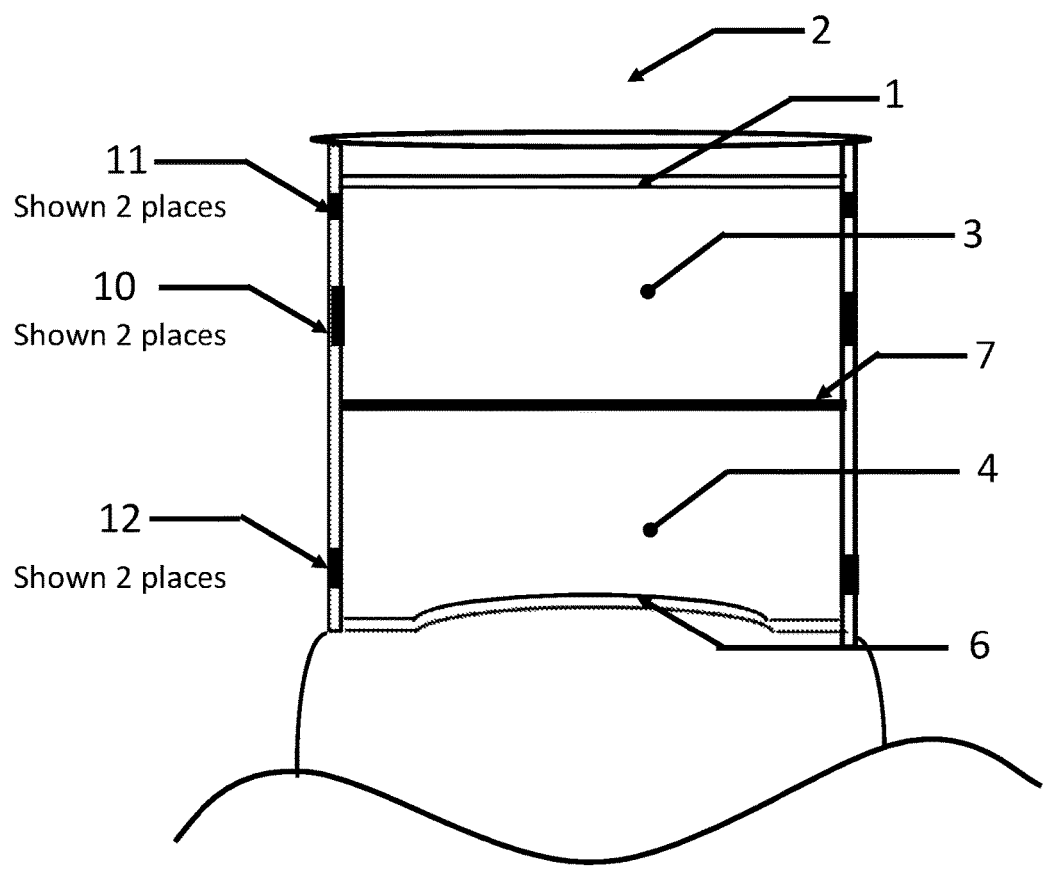
Figure 5:
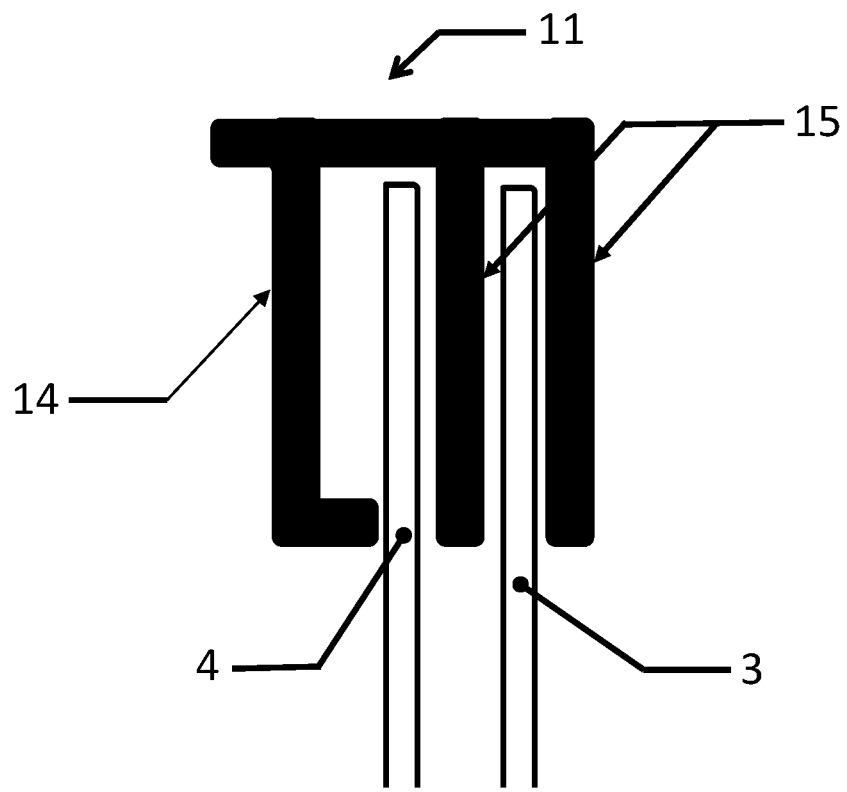
FIG. 5 is a cross section of one embodiment of an attachment device which attaches the lower portion of the window to the upper portion of the window.
Figure 6:
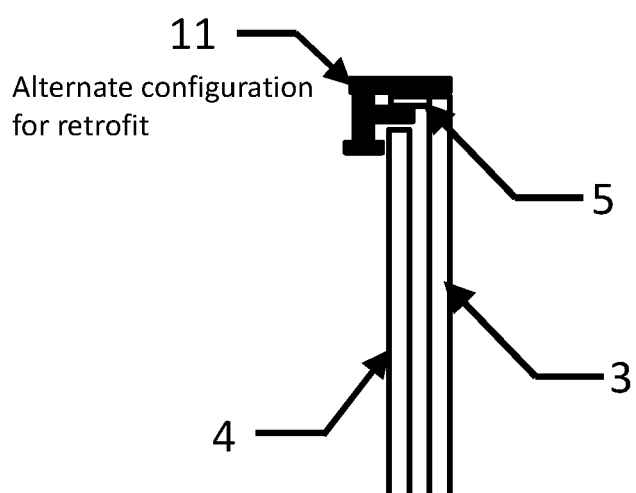
FIG. 6 is a cross section of an alternate embodiment of an attachment device which attaches the lower portion of the window to the upper portion of the window.

The movable lower portion (4) is held in a folded position by a second attachment device(s) (11). In FIG. 1A, the second attachment device (11) is located at the top edge of the upper portion (3) of the windshield (1). When the second attachment device is attached at the top edge of the windshield (1), the profile of the upper portion (3) of the windshield may optionally have a slight notch (not shown) in the top edge to accommodate the clamp. The actual dimensions of the notch will vary based on the embodiment of the clamp/clip. Embodiments of the clamp or clip used at the top edge of the window are shown in FIGS. 5 and 6. The second attachment device(s) (11) of this embodiment may comprise 1, 2 or more attachment devices. In FIG. 1B, the second attachment device is located at the side edges of the upper portion of the windshield. The second attachment device is shown in 2 places. The second attachment device of this embodiment may comprise 1, 2, or more attachment devices. When the second attachment is located at the side edges of the window (1), the second attachment device(s) (11) is typically a post clamp on vertical struts (8). The post clamp in this embodiment may be used to perform the function of the first attachment device (10) and the second attachment device (11), i.e. the post clamp may fixedly attach the upper portion (3) to the support structure and secure the lower portion (4) when in the folded position.

Further, in an embodiment not depicted, the second attachment device may be fixedly attached to the lower portion (4) of the windshield (1), wherein the second attachment device (11) attaches to the upper portion of the window (3) when the lower portion (4) is in the folded position.

In FIGS. 1A and 1B, the lower portion of the windshield (4) is shown in the non-folded position and secured by a third attachment device(s) (12), which are also typically post clamps. The third attachment device (12) is shown in 2 places. The third attachment device (12) of this embodiment may comprise 1, 2 or more attachment devices. The lower portion of the windshield may have a curved profile (6) along the bottom edge to allow for a close fit with the golf car.

The upper portion (3) may have a color changing property for example by photochromic, thermochromic, or electrochromic means that tint the upper portion of the windshield when exposed to bright visible light, temperature or electro current, while the lower portion remains transparent or is tinted a lighter color. When the lower portion is folded over the upper portion, good visibility is retained as only one portion of the windshield darkens.

Typically, golf car windshields are formed from acrylic or modified acrylic. In one embodiment, when polychromic film is used, the windshield is made of polycarbonate. Other materials, such as the typically used acrylic or modified acrylic, are also acceptable. The upper portion (3) and lower portion (4) may be formed of different materials, i.e. the upper portion (3) with color changing properties may be formed from polycarbonate, while the lower portion (4) could be made from acrylic or modified acrylic, decreasing material costs. In a preferred embodiment, a polychromic film provides the color change property and is formed on the surface of the upper portion (3) of the windshield facing the interior of the vehicle with a hard coat or mar resistant film on the surface of the windshield opposite the polychromic film.

Figure 2B:
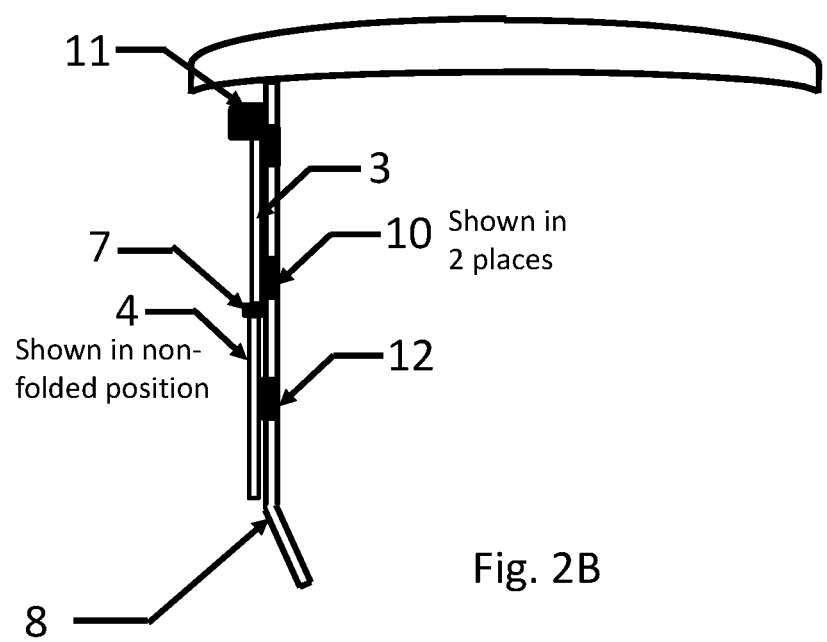

FIG. 2 is a side view of FIG. 1, specifically FIG. 2B is a side view with the lower portion of the window in a non-folded position as depicted in FIG. 1A. FIG. 2A is identical to FIG. 2B, except the lower portion (4) of the window (1) is in the folded position and is secured by the second attachment device (11) shown at the top edge of the windshield, similar to FIG. 1A. When the lower portion of the windshield is folded as shown in FIG. 2A, air flow from the moving vehicle creates a cooling wind in the vehicle compartment without the wind buffeting the occupants face. Further, the air flow is more aerodynamic and creates less drag on the moving vehicle.

When the second attachment device (11) is a post clamp as shown, the fixed upper portion (3) is optionally also held by second attachment device(s) (11). Further, the top fixed portion of the windshield may optionally comprise an L-shape portion (5) that extends substantially perpendicular to the vertical strut and extends out toward the front of the vehicle and over the second attachment device(s) (11).

Figure 3A:
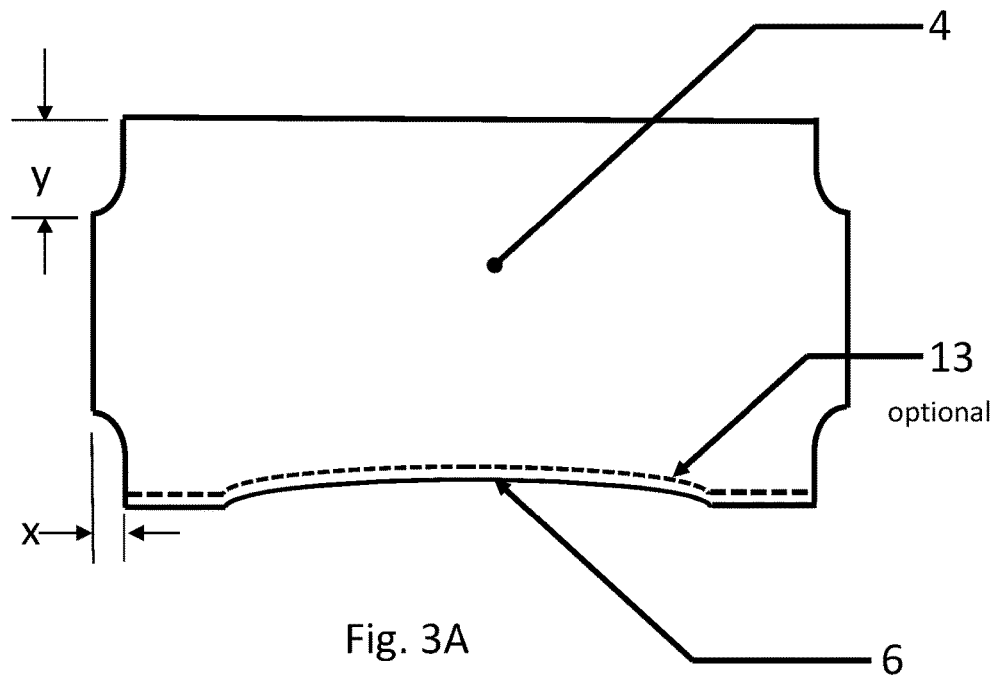
FIGS. 3A and 3B show the profile of the lower portion of the window of one embodiment and a cross section of a u-shaped plastic stripping that may be used to protect an edge of the windshield.
Figure 3B:
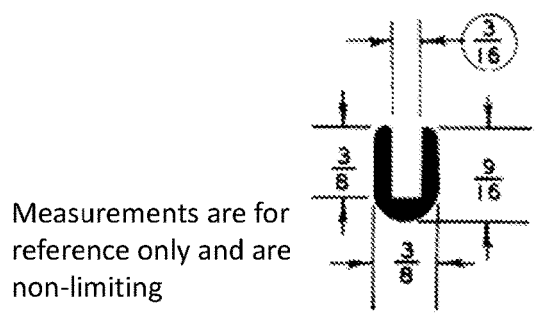

FIG. 3 depicts one embodiment for the lower portion (4) of the windshield (1) wherein there is a profile (6) along the bottom edge to accommodate the hood of the golf car or other vehicle. Each corner is notched in the x and y directions to accommodate a plurality of first attachment devices that fixedly attach the upper portion (3) of the windshield (1) to the support structure (8). The dimensions of x and y are customizable for the type and brand of golf car, PST, LSV and/or utility vehicle. A u-shaped stripping (13), shown in FIG. 3B, is optionally installed along the bottom edge of the lower portion of the windshield to provide protection and/or seal against the vehicle hood. The u-shape stripping is generally plastic or rubber, wherein one embodiment is formed from ethylene propylene diene monomer (EPDM). The u-shaped stripping may be adhered by adhesive, but adhesive is not required. In one preferred embodiment, the lower portion (4) does not comprise color change properties.

Figure 4A:
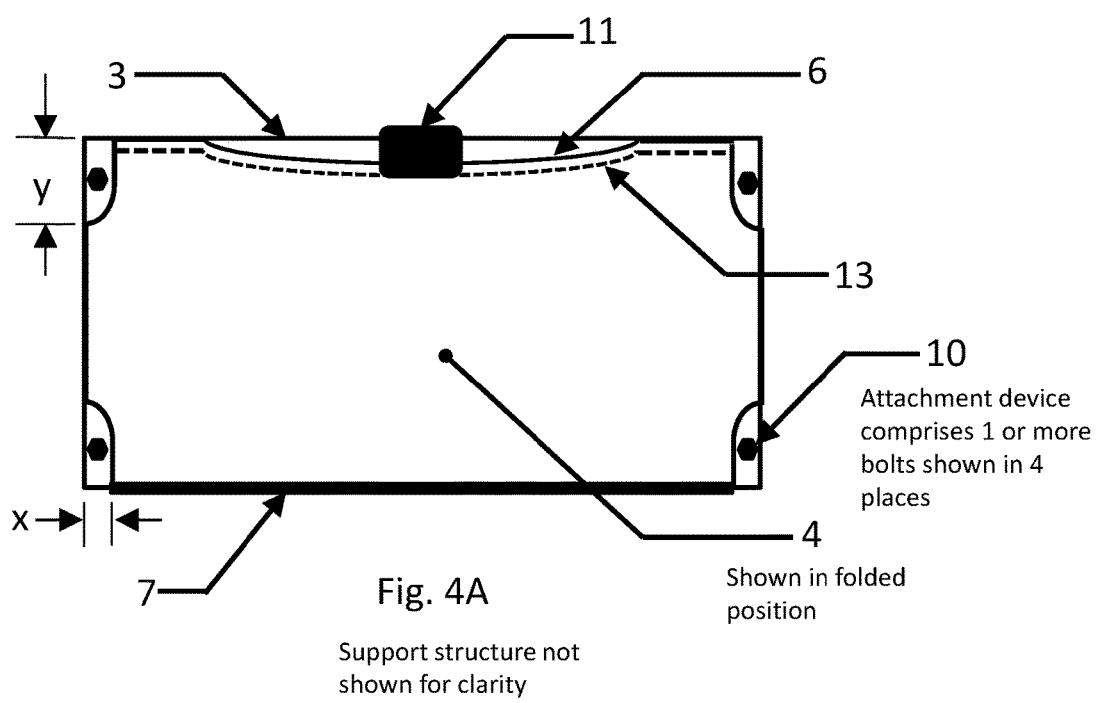
FIGS. 4A and 4B are planar views of the lower portion of the window from FIG. 3A and the upper portion of the window.
Figure 4B:
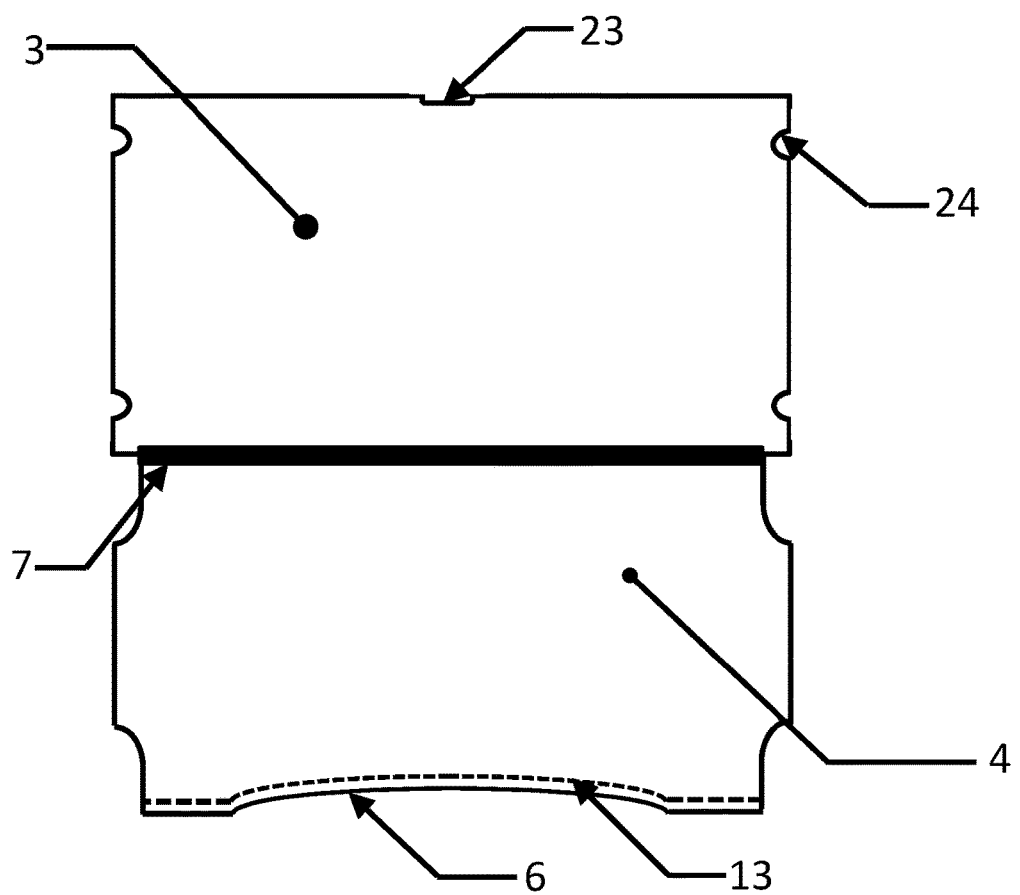
Figure 8A:
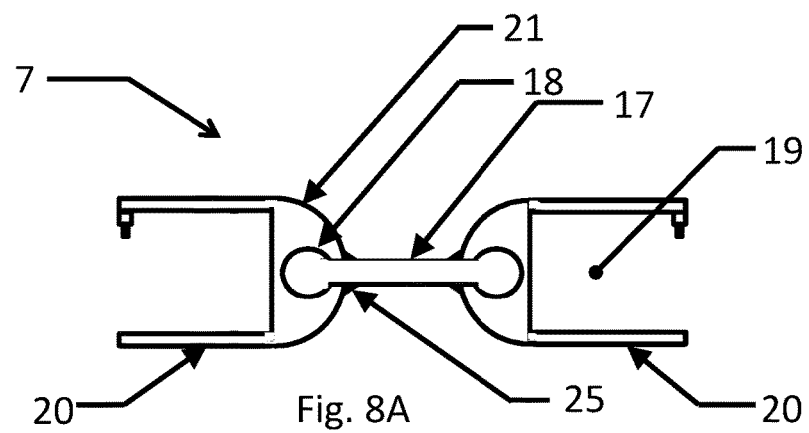
FIGS. 8A, 8B and 8C are cross sectional views of alternate embodiments of a living hinge useable in the invention.
Figure 8B:
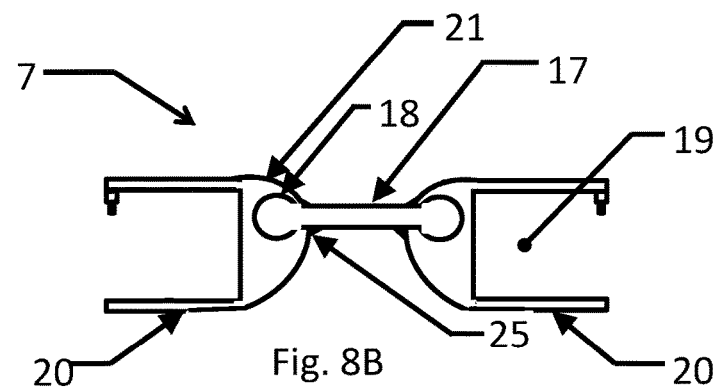
Figure 8C:
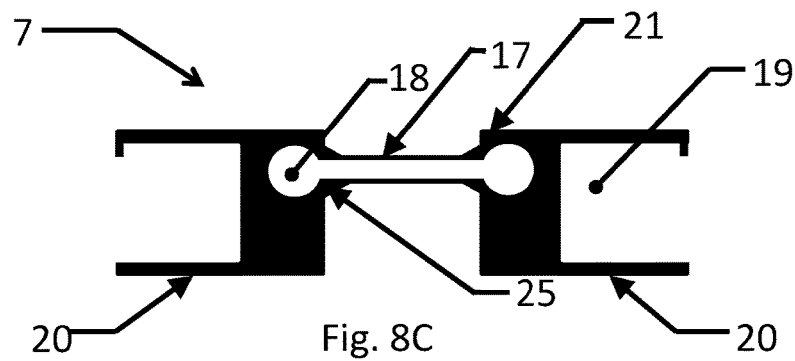

FIG. 4A depicts a planar view of the lower portion (4) shown in FIG. 3A in the folded position, over upper portion (3). The notches at the 4 corners of the lower portion (4) clear the first attachment devices (10), shown in FIG. 4A as bolts, 2 bolts in each location. FIG. 4B depicts a planar view of the lower portion (4) shown in FIG. 3A in the non-folded position, connected to upper portion (3) by the rotatable device (7). When one or more bolts are used as the first attachment device, the upper portion (3) of the windshield (1) would typically comprise notches (24) to accommodate the bolts. The bolt holds the windshield to the vertical strut through the use of a rubber or plastic grommet. Further, the rotatable device is depicted as a living hinge; embodiments of a living hinge are shown in FIGS. 8A through 8C. The second attachment (11) is located at the center top edge of the windshield (1) and is fixedly attached to the upper portion (3) while the lower portion (4) is secured in the folded position. The upper portion (3) of the windshield (1) may optionally comprise a slight notch (23) to accommodate a top mounted attachment device (11).

FIG. 5 depicts one embodiment of a clamp that is useable in FIG. 1A and FIG. 4, wherein the second attachment device is installed at the center top edge of the upper portion (3) of the windshield (1). In this embodiment, the windshield would be flat, i.e. optional L-shaped portion (5) is not present. The flanges (15) fixedly attach to the upper portion (4) of the window (1), while the clamp extrusion (14) is able to be manually manipulated while the lower portion (4) is folded in place and released to secure the lower portion (4) while moving. The optional notch (23) at the edge of the upper portion (3) is preferably used when the clamp of this embodiment is used. The clamp is preferably within a range of 1 inch to 2.5 inches in depth and more preferably within a range of 1.5 inches to 2.0 inches in depth, and within a range of 1 inch to 3 inches in length and more preferably within a range of 1.7 inches to 2.5 inches in length. The spacing between flanges (15) is within a range of 0.1 inch to 0.25 inch and more preferably within a range of 0.17 inch to 0.22 inch. The distance between the bottom of the clamp extrusion (14) and the adjacent flange (15) is preferably within a range of 0.25 inch to 0.5 inch and more preferably is within a range of 0.30 inch to 0.42 inch.

FIG. 6 depicts an alternate embodiment of a clamp that is useable in FIG. 1A and FIG. 4. The flanges are fixedly attached to an L-shaped portion (5) of the windshield (1). The L-shaped portion (5) is optional for the upper portion (3) and would typically be found if an existing window was retrofitted. In this embodiment, again, the clamp extrusion is able to be manually manipulated while the lower portion (4) is folded in place and released to secure the lower portion (4) while moving. The clamps shown in FIGS. 5 and 6 may be used as a single clamp or may be used in a multiple clamp configuration. The embodiments shown are preferred examples of clamps or clips that are fixedly attached to upper portion (3), typically along the top edge, but clamps or clips located in this position are not limited to the embodiments depicted.

Figure 7:
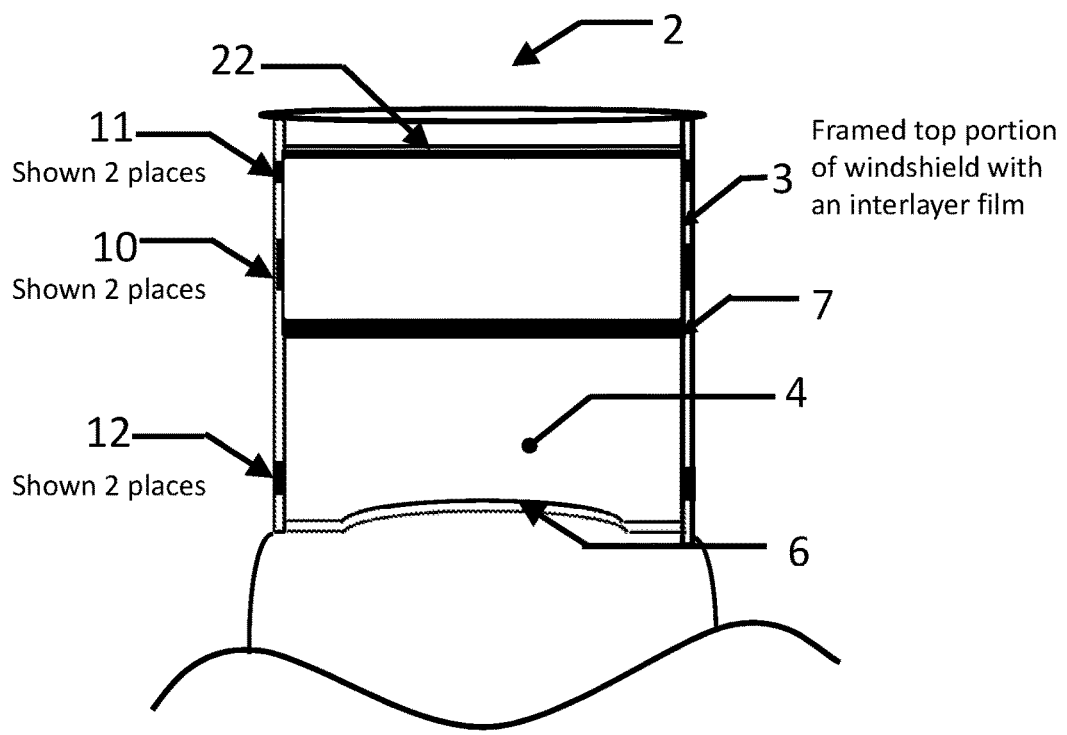
FIG. 7 depicts an embodiment wherein the upper portion of the windshield is framed.

FIG. 7 illustrates an embodiment wherein the windshield has a frame on three sides or a portion thereof. In this embodiment, the windshield does not comprise the optional L-shaped portion, but the frame may be L-shaped, which would allow the frame to be used with the clamp of FIG. 6 and/or post clamps at the side of the windshield. The second attachment device would be used on the frame and if bolted, the bolt would go through the frame. If the second attachment device were affixed by an extrusion trench, then it would hold the frame or the frame and windshield. The frame is beneficial for multi-layered window constructions.

FIGS. 8A, 8B and 8C comprise a preferred embodiment for the rotatable device (7), wherein the rotatable device is a living hinge. The living hinge would preferably be clear or translucent in color. The living hinge comprises a connecting membrane (17) attached to the main bodies (20) of the hinge through a ball type joint (18). The main bodies (20) comprise an insert cavity (19) with a groove and insert to maintain a device such as the instant windshield in place when attached by the living hinge. The body of the hinge comprises an extended connecting portion (21) that is profiled to provide sufficient material to accommodate the ball type joint connecting the membrane to the body while allowing the hinge to fold a minimum of 180°. The extended connecting portion may comprise a tapered profile (25) that extends past the ball type joint, along the membrane, to minimize bending stress on the membrane. The profile of the connecting portion as shown comprises a section of an elliptical or sphere in the embodiments as shown in FIGS. 8A and 8B. If the profile was not curved as shown, corners of an extended connecting portion would block the living hinge from folding sufficiently to allow the instant windshield to fold to the desired position. In an alternate embodiment shown in FIG. 8C, the extended connecting portion (21) is square, but the ball joint is off-center to allow rotation in a single direction. In the embodiment shown in FIG. 8B, the extended connecting portion is shaped as an elliptical or sphere, but along with the ball joint is off-center. Full rotation would be allowed in one direction, while maintaining some rotation in the second direction. The style of extended connecting portion and the location of the ball joint, i.e. centered or off-entered, are determined by the intended use of the hinge. Without an extended connecting portion, a ball type joint could not be used, weakening the connection between the membrane and the body. Adhesive is not required for the living hinge as disclosed herein, which is advantageous based on the material of the windshield.

Embodiments not depicted in FIGS. 8A, 8B and 8C include the fold up windshield (1) wherein the lower portion (4) comprises two sections (4*a* and 4*b*) (not shown) wherein the two sections are able to be folded independently. Further, the upper portion (3) may be opened by tilting the upper window away from the golf car and held in place by side hinges. The upper portion (3) would continue to protect the face of the occupants in the tilted position. The upper portion (3) and lower portion (4) may have other opening means such as a sliding portion that allows for further air flow.

The color changing properties of the instant invention may be photochromic, electrochromic or thermochromic and may be provided as a film or included as an additive to the windshield material. If provided as a film including a color change substance, the film may be applied to either surface or embedded. To embed the film within the windshield (1) or a portion thereof, structural portions of the windshield (1), structural components would sandwich the film. The structural components may comprise acrylic, modified acrylic, polycarbonate, glass, safety glass or any other suitable windshield material. The embodiments comprising one or more films, on an external surface or embedded between structural portions and the embodiment wherein an additive is added to the windshield are envisioned as usable together, depending on the climate and environment where the windshield will be used. For example, the film may be applied to the external or internal surfaces of the structural portions of the windshield.

A windshield having such photochromic, electrochromic or thermochromic perperties can also be put into a golf car cover or enclosure that is typically used for rainy and/or cold weather. Such a cover is available, for example, from Clear Vision of Midvale, Utah.

Additional films may be utilized on or embedded in the windshield. Clear films that provide UVA and UVB protection, laminate films that create a shatterproof windshield and prevent breakage, and films that are mar and abrasion resistant may be combined with the color changing film. The additional film(s) may be provided in a multi-layer form or an integral form with the color changing film or separate films located on opposite surfaces of the windshield. A preferred embodiment comprises a mar and abrasive resistant film that provides UVA and UVB protection on the external surface of the upper portion (3), optionally on the external and/or internal surface of lower portion (4), while a color changing film is provided on the internal surface of upper portion (3).

The color changing film or additive typically comprises a brown or gray appearance when activated, reverting to clear when not activated. Specific color can be adjusted based on reducing reflection and providing sufficient protection. When the color changing property comprises a photochromic film or additive, the film or additive may have a concentration of 0.01% to 10%, 0.5 to 5%, preferably 0.6 to 1.25%, more preferably 0.7% or 1%. If the photochromic percentage is too high, reflections as viewed by the occupant increase and if the photochromic percentage is too low, insufficient window tinting occurs. The percentage may be modified based on climate or environment for the end use. The photochromic substance is of the type that undergoes a color change when exposed to increased visible light and reverts to transparent when visible light is decreased.

Anti-reflection treatments may be used to reduce reflection caused by the color changing properties. The anti-reflection treatment may consist of surface treatments such as texturing a surface of the windshield or an anti-reflecting film with an index of refraction different from the color changing film or windshield such as silicon oxide or silicon nitride. These and other anti-reflection treatments known for use on windows and windshields allow a deeper concentration of color change active ingredient in the film or structure.

The present invention, using a fixed upper windshield portion, allows for several enhancements, including the color changing properties above. In another enhancement, a media system is utilized to create a virtual display of information on the fixed upper portion of the windshield, which may be used with or without the color changing properties.

In one embodiment, the media system displays one or more of a map of the golf course and the user's current location, distance to the hole as the golf cart is stopped next to the user's ball on a fairway or green, general information on environmental conditions, such as wind speed and direction, weather alerts, hole specific information such as hole location in the putting green and/or fairway distance and width, advertising information, club house or club store specials, or any other information desired by the owner of the system.

The media system may include one or more of the following: method for projection of a virtual display image, i.e. a virtual display generating unit, which may be located in the interior space of the vehicle, a display area on the windshield, preferably the upper windshield portion, a patch at the location of the display area on the windshield that enables easier viewing of the generated virtual display image, i.e. viewing patch, an on-board computer capability, e.g. memory for storage, random access memory (RAM) memory for system operation, processor, graphic chip, etc., a connector and/or wiring to receive operating power from the vehicle to the media system, computer, and/or virtual display generating unit, a connector to power a separately provided virtual display generating unit and a location mounting area for the separately provided unit, a system to receive information by one or more of loading software onto an onboard system, possible methods including FIREWIRE™, universal serial bus (USB) port, blue tooth, or similar, an on-board receiving unit to receive information transmitted from a hand-held device through a blue tooth connection, "air dropped", an on-board receiving unit that receives real time information through stations located throughout the golf course operated from a central location or loaded from a central location such as a club house, club store or club garage, or any combination of the above.

The optional viewing patch may be located on the fixed upper portion of the folding windshield at the intended virtual display location, i.e. display area. The viewing patch would be formed of any color and any material that would enhance the viewing of the display image. The viewing patch may be formed of a reflective dielectric stack, distributed Bragg reflector, Bragg reflector, micro-electrical-mechanical system (MEMS) reflector, partially transparent metallic reflective mirror coating, or a series of thin coatings forming a reflective or partially reflective surface. The patch may include a substrate for the patch, wherein the substrate may be made of any polymer or thin glass. Specifically, the patch would be at least the size of the intended display area, or 5%, 10%, 20%, 25% or 100% larger than the intended display area, and be incorporated on the fixed upper portion of the windshield, either on the internal or external side of the windshield or mounted between an inner and outer windshield layer. The patch may be securely bonded, laminated or integrally incorporated into, onto or within the windshield. The patch may be temporary and/or removable, possibly held in place by static forces or weak adhesive, e.g. windshield sticker. The color changing film or integral chemical composition, if present, may partially or fully overlap the patch or be formed around the patch no portion of the color changing substance or compound overlapping the patch. The upper windshield portion may include markings or indicia that indicate where the patch is to be located on the upper windshield portion. The markings of indicia for the patch location may be an absence or reduction of color changing substance or compound. Alternatively, the markings or indicia for the patch may be scribed into the upper windshield portion, printed on the upper windshield portion or affixed on the upper windshield portion.

Figure 9:
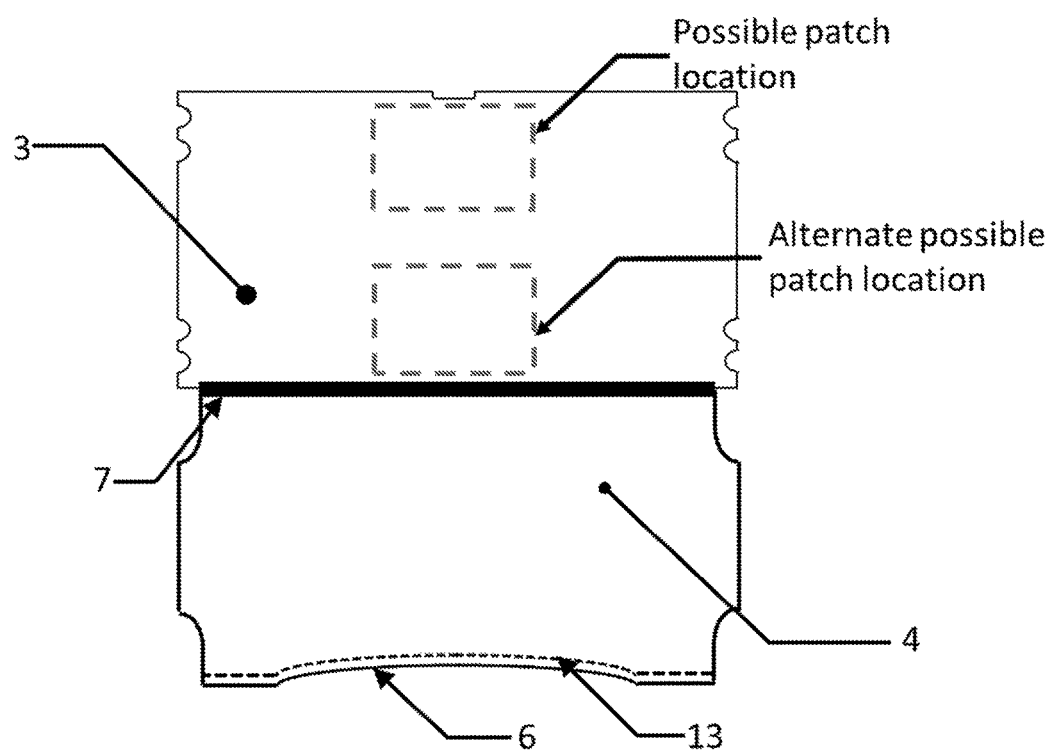
FIG. 9 is a planar view of the upper portion of the windshield and the bottom portion of the windshield with the bottom windshield portion in the non-folded position, and with a possible viewing patch location, and an alternate possible viewing patent location, integrally formed with or affixed to the upper windshield portion.

The virtual display, the display area, and the optional viewing patch may be fully or partially transparent or opaque. The display area and the optional viewing patch may be located in an area that would not compromise the driver's ability to operate the vehicle. The display area and optional viewing patch may be located in the upper central position of the fixed upper windshield portion, may be located to be visible immediately below a rearview mirror, or alternatively displayed centrally on the fixed upper windshield portion immediately above the folding lower portion. See FIG. 9. Furthermore, the display area and optional viewing patch may be located in any location along the periphery of the fixed upper windshield portion. The display system would be operational with the windshield folded or not folded.

Figure 10:
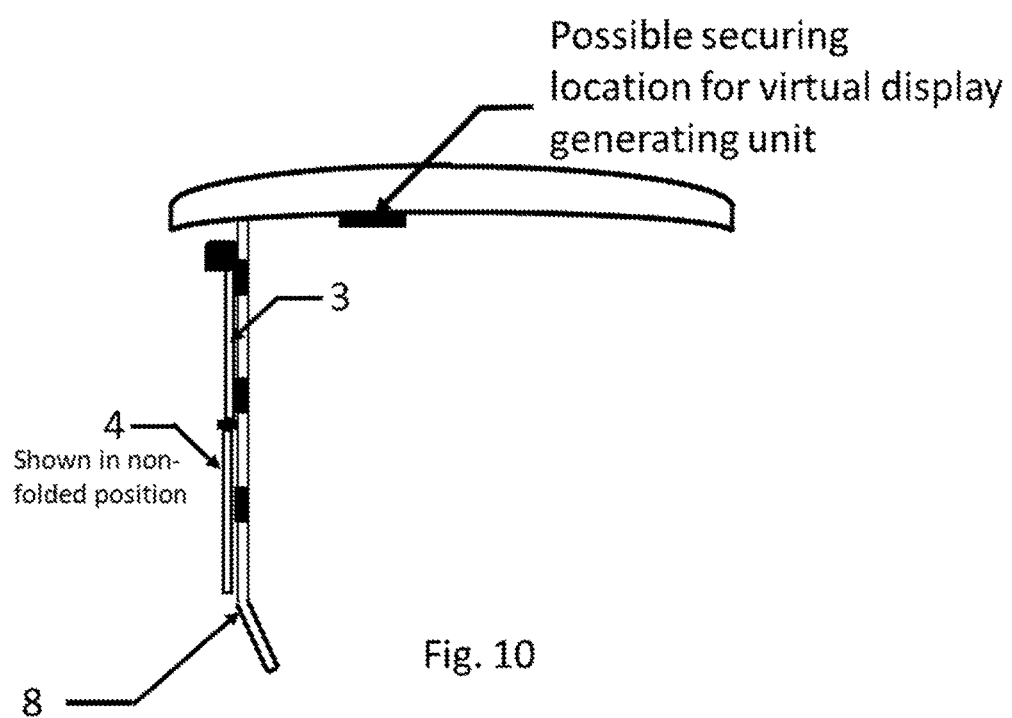
FIG. 10 is a side view of a low speed vehicle with the bottom windshield portion in the non-folded position, and with a VDGU attached to the roof of the vehicle.
Figure 11:
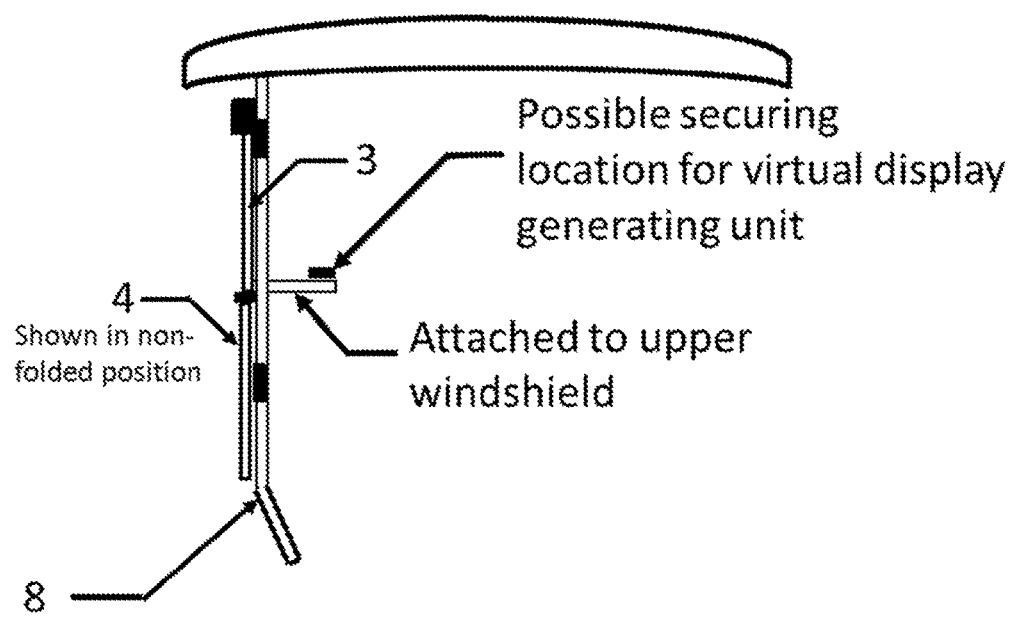
FIG. 11 is a side view of a low speed vehicle with the bottom windshield portion in the non-folded position, and with a VDGU and a support therefor attached to the bottom periphery of the upper windshield portion.

The virtual display generating unit (VDGU) and/or mounting provisions for a virtual display generating unit may be located so the image is displayed in the intended virtual display viewing unit. The VDGU or mounting provisions may be located or suspended from the interior side of the vehicle roof (FIG. 10) attached to the bottom periphery of the upper windshield portion (FIG. 11), on the steering wheel shaft, on the dash board, or between the passenger seats. The mounting provisions may have provisions for a long-term installation of the VDGU or may have provisions for temporarily securing a separate mobile unit. In general, it is preferable the VDGU and/or mounting provisions for the VDGU are closely located to the virtual display area. The color changing film or integral chemical composition, if present, may partially or fully overlap the virtual display area or formed around the virtual display area.

In one embodiment, controls are provided for the user to choose between information displays, e.g. choose between course information, wind conditions, hole information, or distance to the hole from the vehicle location. In another embodiment, a weather alert, such as a lightning storm alert, or an alert to take shelter may override the user's choice of displays. User controls for the VDGU (FIGS. 10 and 11) may be integral with the VDGU or a user control unit electrically connected to the VDGU, either hard wire or through a connector. The user control unit may be mounted on the steering wheel, on the dashboard, between the passenger seats, on a unit mounted on the interior of the vehicle roof. Alternately, the VDGU may be controlled from a smart phone, i.e. android or Apple. A VDGU control app may possibly be available for download. The smart phone may, connect to the VDGU via Bluetooth, "Air Drop", provided Wi-Fi, or a connector may be provided to connect the phone to the VDGU.

Accordingly, the preferred embodiments of the present invention have been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A golf cart, personal transport vehicle or low speed vehicle comprising:
    an interior space of the vehicle including a passenger compartment;
    a windshield, with the windshield comprising:
    an upper windshield portion,
    a bottom windshield portion connected to the upper windshield portion,
    a rotatable device attaching the upper windshield portion to the bottom windshield portion;
    wherein the upper windshield portion is a fixed upper windshield portion and the bottom windshield portion is a movable bottom windshield portion, with the fixed upper windshield portion configured to latch the movable bottom windshield portion in a folded position over the upper fixed windshield portion; and
    the golf cart, personal transport vehicle or low speed vehicle further comprising a media system which creates a virtual display of information on a display area of the upper windshield portion, with the media system comprising a virtual display generating unit (VDGU) or a support for a VDGU attached within the interior space of the vehicle and with the media system further comprising user controls for the VDGU, the user controls being integral to the VDGU, connected by wire to the VDGU, connected wirelessly to the VDGU, or provided through an app downloadable to a smart phone.

2. The golf cart, personal transport vehicle or low speed vehicle of claim 1, wherein the VDGU or the support for a VDGU is oriented so a virtual display generated by the VDGU appears on the display area of the upper windshield portion.

3. The golf cart, personal transport vehicle or low speed vehicle of claim 1, wherein the VDGU or a support for the VDGU attached within the interior space of the vehicle is attached to the roof of the golf cart, personal transport vehicle or low speed vehicle or attached to a bottom periphery of the upper windshield portion.

4. The golf cart, personal transport vehicle or low speed vehicle of claim 1, wherein the media system further comprises a viewing patch located at the display area and is integrally formed with or affixed to the upper windshield portion.

5. The golf cart, personal transport vehicle or low speed vehicle of claim 4, wherein the upper windshield portion comprises marking or indicia indicating a location of the viewing patch;
    wherein the marking or indicia are scribed in the upper windshield portion, are printed on the upper windshield portion or are affixed to the upper windshield portion.

6. The golf cart, personal transport vehicle or low speed vehicle of claim 1, wherein the windshield comprises a color changing substance or compound.

7. The golf cart, personal transport vehicle or low speed vehicle of claim 6, wherein the system further comprises a viewing patch located at the display area and is integrally formed with or affixed to the upper windshield portion;
- wherein the color changing substance or compound surrounds the viewing patch with no portion overlapping the viewing patch, or at least partially overlaps the viewing patch.

8. The golf cart, personal transport vehicle or low speed vehicle of claim 7, wherein the upper windshield portion comprises marking or indicia indicating a location of the viewing patch;
- wherein the marking or indicia is an absence or reduction of the color changing substance or compound.

9. The golf cart, personal transport vehicle or low speed vehicle of claim 6, wherein the bottom windshield portion comprises less of a color changing substance or compound than the upper windshield portion.

10. The golf cart, personal transport vehicle or low speed vehicle of claim 9, wherein a percentage of color changing substance or compound of the bottom windshield portion is 0%.

11. The golf cart, personal transport vehicle or low speed vehicle of claim 6, wherein the means for changing color is a photochromic chemical that changes color in response to light.

12. The golf cart, personal transport vehicle or low speed vehicle of claim 11, wherein the photochromic chemical is included in a film applied to the windshield or buried in the windshield.

13. The golf cart, personal transport vehicle or low speed vehicle of claim 11, wherein the photochromic chemical is included integrally in the material of the windshield.

14. The golf cart, personal transport vehicle or low speed vehicle of claim 6, wherein the means for changing color is an electrochromic chemical that changes color in response to an electrical signal.

15. The golf cart, personal transport vehicle or low speed vehicle of claim 14, wherein the electrochromic chemical is included in a film applied to the windshield or buried in the windshield or the electrochromic chemical is included integrally in the material of the windshield.

16. The golf cart, personal transport vehicle or low speed vehicle of claim 14, wherein the electrochromic chemical comprises liquid crystal.

17. A golf cart, personal transport vehicle or low speed vehicle comprising:
- an interior space of the vehicle including a passenger compartment;
- a windshield, with the windshield comprising:
  - an upper windshield portion,
  - a bottom windshield portion connected to the upper windshield portion,
  - a rotatable device attaching the upper windshield portion to the bottom windshield portion;
  - wherein the upper windshield portion is a fixed upper windshield portion and the bottom windshield portion is a movable bottom windshield portion, with the fixed upper windshield portion configured to latch the movable bottom windshield portion in a folded position over the upper fixed windshield portion; and
- the golf cart, personal transport vehicle or low speed vehicle further comprising a media system which creates a virtual display of information on a display area of the upper windshield portion, with the display area comprising a viewing patch integrally formed with or affixed to the upper windshield portion.

18. The golf cart, personal transport vehicle or low speed vehicle of claim 17, wherein the media system comprises a virtual display generating unit (VDGU) or a support for a VDGU;
- wherein the VDGU or the support for a VDGU is attached within the interior space of the vehicle.

19. The golf cart, personal transport vehicle or low speed vehicle of claim 18, wherein the VDGU or the support for a VDGU is oriented so a virtual display generated by the VDGU appears on the display area of the upper windshield portion.

20. The golf cart, personal transport vehicle or low speed vehicle of claim 18, wherein the VDGU or a support for the VDGU attached within the interior space of the vehicle is attached to the roof of the golf cart, personal transport vehicle or low speed vehicle or attached to a bottom periphery of the upper windshield portion.

21. The golf cart, personal transport vehicle or low speed vehicle of claim 18, wherein the media system further comprises user controls for the VDGU, the user controls being integral to the VDGU, connected by wire to the VDGU, connected wirelessly to the VDGU, or provided through an app downloadable to a smart phone.

22. The golf cart, personal transport vehicle or low speed vehicle of claim 17, wherein the upper windshield portion comprises marking or indicia indicating a location of the viewing patch;
- wherein the marking or indicia are scribed in the upper windshield portion, are printed on the upper windshield portion or are affixed to the upper windshield portion.

23. The golf cart, personal transport vehicle or low speed vehicle of claim 17, wherein the windshield comprises a color changing substance or compound.

* * * * *

UNITED STATES PATENT AND TRADEMARK OFFICE
CERTIFICATE OF CORRECTION

| | |
|---|---|
| PATENT NO. | : 10,493,825 B2 |
| APPLICATION NO. | : 16/148348 |
| DATED | : December 3, 2019 |
| INVENTOR(S) | : Fitz Woodrow |

It is certified that error appears in the above-identified patent and that said Letters Patent is hereby corrected as shown below:

On the Title Page

Item (54) Title and in the Specification, Column 1, Line 1, Delete "WINDSHEILD" and replace with -- WINDSHIELD -- therefor.

Signed and Sealed this
Fourteenth Day of April, 2020

Andrei Iancu
*Director of the United States Patent and Trademark Office*